United States Patent
Sawatani et al.

(10) Patent No.: US 6,598,925 B2
(45) Date of Patent: Jul. 29, 2003

(54) FIXING STRUCTURE FOR STORAGE DEVICE

(75) Inventors: Seiji Sawatani, Kanagawa-ken (JP); Toshiko Watanabe, Kanagawa-ken (JP); Toshihiko Ookawara, Kanagawa-ken (JP)

(73) Assignee: Piolax Inc., Kanagawa-Ken (JP)

( * ) Notice: Subject to any disclaimer, the term of this patent is extended or adjusted under 35 U.S.C. 154(b) by 0 days.

(21) Appl. No.: 10/179,178

(22) Filed: Jun. 26, 2002

(65) Prior Publication Data

US 2003/0001402 A1 Jan. 2, 2003

(30) Foreign Application Priority Data

Jun. 28, 2001 (JP) .......................... 2001-196686

(51) Int. Cl.⁷ .............................................. B60R 11/06
(52) U.S. Cl. .................................. 296/37.1; 296/37.12
(58) Field of Search ........................... 296/37.1, 37.12; 360/132, 133, 99.08; 312/9.57, 222; 52/641; 206/0.81

(56) References Cited

U.S. PATENT DOCUMENTS

| | | | | |
|---|---|---|---|---|
| 2,073,171 A | * | 3/1937 | Pittroff | 296/37.12 |
| 4,075,643 A | * | 2/1978 | Lane | 396/37 |
| 4,169,624 A | * | 10/1979 | Yefsky et al. | 248/27.1 |
| 4,778,228 A | * | 10/1988 | Ackeret | 312/9.57 |
| 4,867,498 A | * | 9/1989 | Delphia et al. | 296/37.7 |
| 5,393,137 A | * | 2/1995 | Bivens et al. | 296/37.9 |
| 5,403,058 A | * | 4/1995 | Fischer | 296/37.7 |
| 5,460,309 A | * | 10/1995 | Nehl et al. | 296/37.12 |
| 5,628,543 A | * | 5/1997 | Filipovich et al. | 296/37.1 |
| 5,639,116 A | * | 6/1997 | Shimizu et al. | 296/37.1 |
| 5,692,718 A | * | 12/1997 | Bieck | 248/311.2 |
| 5,743,585 A | * | 4/1998 | Pranger et al. | 296/37.12 |
| 5,791,578 A | * | 8/1998 | Kurokawa et al. | 242/338.3 |
| 5,868,448 A | * | 2/1999 | Izumo | 296/37.1 |
| 5,971,461 A | * | 10/1999 | Vaishnav et al. | 296/37.12 |
| 6,003,925 A | * | 12/1999 | Litke et al. | 296/37.7 |
| 6,042,168 A | * | 3/2000 | Bieri | 296/37.12 |
| 6,062,623 A | * | 5/2000 | Lemmen | 296/37.7 |
| 6,135,528 A | * | 10/2000 | Sobieski et al. | 296/37.7 |
| 6,176,534 B1 | * | 1/2001 | Duncan | 296/37.12 |
| 6,176,536 B1 | * | 1/2001 | Miller et al. | 296/37.7 |
| 6,206,260 B1 | * | 3/2001 | Covell et al. | 224/539 |
| 6,354,649 B1 | * | 3/2002 | Lee | 296/37.1 |
| 2002/0158448 A1 | * | 10/2002 | Okonkwo | 296/37.12 |
| 2002/0171018 A1 | * | 11/2002 | Harada | 296/37.12 |

FOREIGN PATENT DOCUMENTS

JP        4 85145      *   3/1992

* cited by examiner

Primary Examiner—Kiran Patel
(74) Attorney, Agent, or Firm—Greenblum & Bernstein, P.L.C.

(57) ABSTRACT

A fixing structure is constituted by a housing (1) fixed to a mounting hole H on the side of a vehicle member, and a storage member 2 supported in the housing (1) so that the storage member (2) can be opened and closed. A frame member 3 made of resin material having greater toughness than the housing (1) is mounted to an outer periphery of the housing (1). The frame member (3) is integrally provided with resilient leg pieces (4A), (4B) and (4C) which are retained to hole edges of the mounting hole (H). With this, the resilient leg pieces (4A), (4B) and (4C) to be retained to the hole edges of the mounting hole (H) on the side of the vehicle member are not provided on the housing (1), but are integrally provided on the frame member (3) made of resin material having greater toughness than the housing (1).

4 Claims, 5 Drawing Sheets

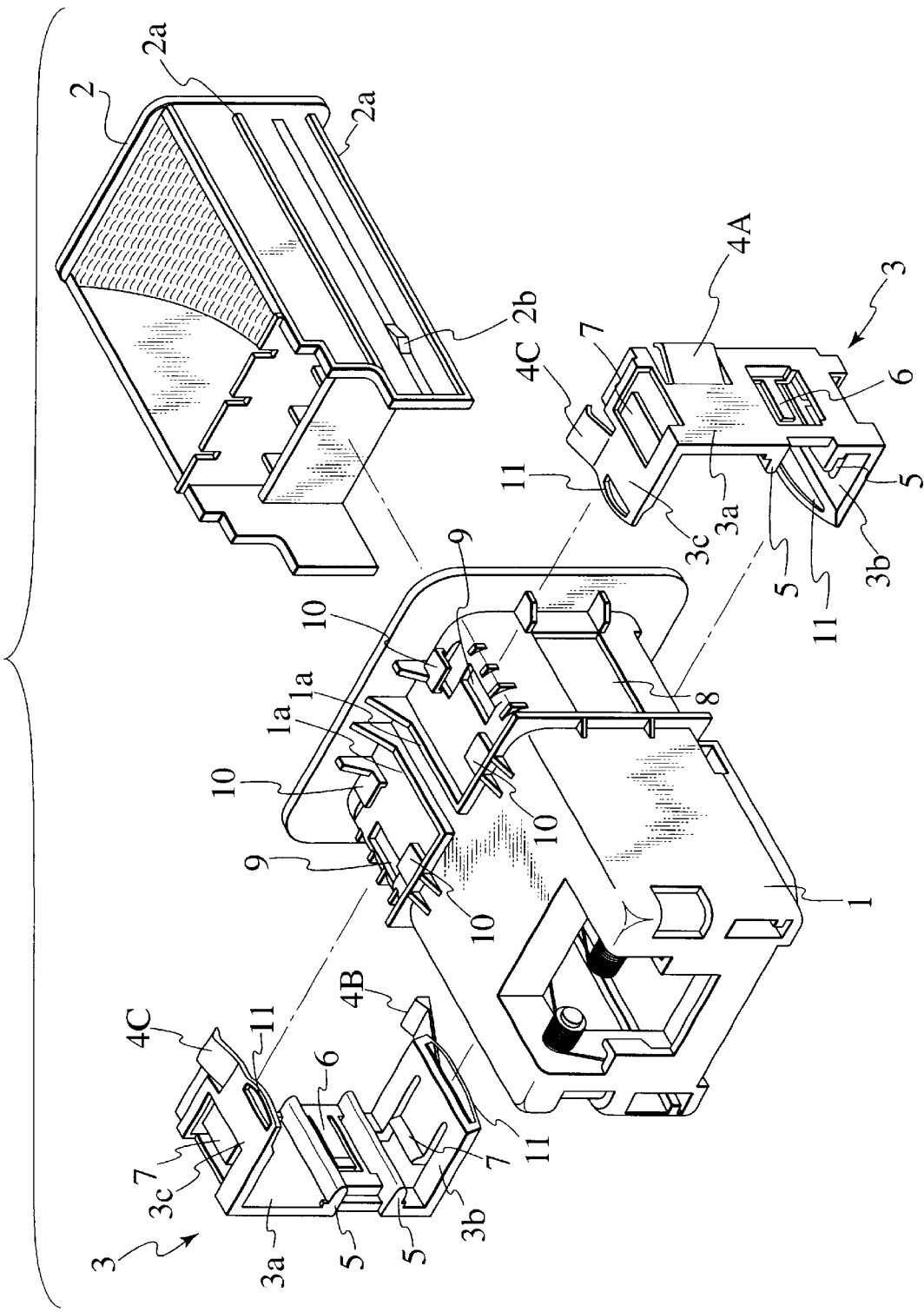

FIXING STRUCTURE FOR STORAGE DEVICE

BACKGROUND OF THE INVENTION

1. Field of the Invention

The present invention relates to a fixing structure for a storage device such as a coin case, a small-article container and an ashtray of an automobile.

2. Description of the Related Art

As shown in FIG. 1, a proposed small-article container for an automobile comprises a housing 101 fixed in a mounting hole formed in an instrument panel on the side of a vehicle member, and a storage member 102 supported in the housing 101 so that the storage member 102 can be opened and closed. Especially the housing 101 is integrally formed at its outer peripheral wall in the vicinity of an opening of the housing 101 with retaining projections 103 which are forcibly retained to hole edges of a mounting hole on the side of the instrument panel.

According to the proposed small-article container, the housing 101 is pushed into the mounting hole of the instrument panel, the retaining projections 103 are forcibly retained to hole edges of the mounting hole from back side. With this, the container can be used as a small-article container. However, the housing 101 itself is usually made of resin material, which is relatively hard and has low toughness such as ABS resin (acrylonitryle-butadiene-stylene resin). Therefore, the retaining projections 103 integrally formed on the housing 101 are inevitably hard and do not have the necessary resilience. Thus, there is a problem that mounting condition and mounting state of the housing 101 are deteriorated.

SUMMARY OF THE INVENTION

The present invention has been accomplished to solve the above problem, and it is an object of the invention to provide a fixing structure for a storage device such as a coin case for an automobile.

The first aspect of the present invention provides a fixing structure for a storage device comprising: a mounting hole; a housing fixed to the mounting hole; a storage member supported in the housing such that the storage member can be opened and closed; a frame member mounted to an outer periphery of the housing; and a resilient leg piece integrally provided on the frame member and retained to a hole edge of the mounting hole, wherein the frame member is made of resin material having greater toughness than that of the housing.

According to the first aspect, the resilient leg pieces to be retained to the hole edges of the mounting hole on the side of the vehicle member are not provided to the housing but are integrally provided to the frame member made of resin material having greater toughness than the housing, and this frame member is mounted to the outer periphery of the housing. Thus, the characteristics of the molding resin material can be obtained, and the resilient leg pieces can be resiliently retained to the hole edges of the mounting hole on the side of the vehicle member.

The second aspect of the present invention provides the fixing structure for a storage device according to the first aspect of the present invention, wherein the frame member has a U-shaped cross section, and each of three surfaces of the frame member are provided with the resilient leg piece.

According to the second aspect, in addition to the first aspect, since the frame member has U-shaped cross section, the resilient leg piece can be provided to each of three surfaces of the frame member. Thus, a remarkable enhancement of the mounting fixing force of the housing can be expected.

The third aspect of the present invention provides the fixing structure for a storage device according to first aspect of the present invention, further comprising: a projection provided in the storage member; and a rail provided in the frame member, wherein when the storage member is opened and closed in the housing, the projection is guided by the rail and moved, and wherein the frame member is made of the resin material having greater abrasion resistance than that of the housing.

According to the third aspect, in addition to the first aspect, the pair of rails for guiding the storage member is made of resin material having greater wear resistance than the housing. With this, the storage member can be moved extremely smoothly.

The fourth aspect of the present invention provides the fixing structure for a storage device according to third aspect of the present invention, wherein a notch window is formed on the housing toward which the rail face, and the resin material having greater toughness and abrasion resistance is engineering plastic.

BRIEF DESCRIPTION OF THE DRAWINGS

The invention will now be described with reference to the accompany drawings wherein;

FIG. 2 is an exploded perspective view showing an embodiment of a fixing structure for a storage device according to the present invention;

DETAILED DESCRIPTION OF THE PREFERRED EMBODIMENT

Figure 1:
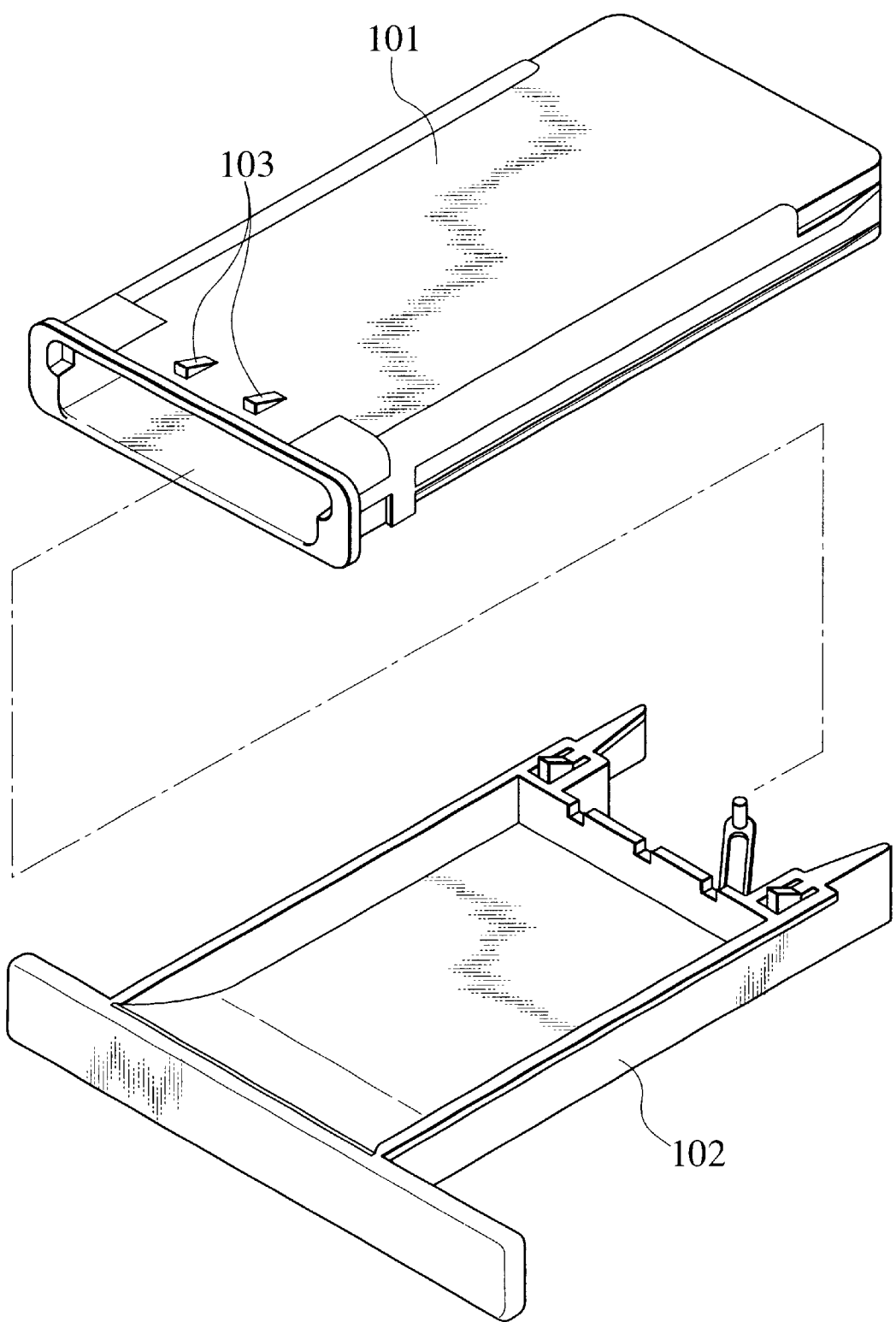
FIG. 1 is an exploded perspective view showing a proposed small-article container for an automobile.

Embodiments of the present invention will be explained below with reference to the drawings, wherein like numbers are designated by like reference characters.

A fixing structure for a storage device of the present embodiment has been developed for a coin case for an automobile. As shown in FIG. 2, the coin case itself comprises, like the proposed coin case, a prismatic housing 1 fixed in a mounting hole formed in an instrument panel on the side of a vehicle member, and a box-like storage member 2 supported in the housing 1 so that the storage member 2 can be opened and closed. Each of the housing 1 and the storage member 2 are integrally formed of resin material, which is relatively hard and has low toughness such as ABS resin.

This embodiment is based on the above-described structure as a precondition. This embodiment is characterized in that a pair of frame members 3 integrally provides with a plurality of resilient leg pieces 4A, 4B and 4C which are retained to the hole edges of a mounting hole of the instrument panel are mounted to an outer periphery of an opening edge of the prismatic housing 1. The pair of frame members 3 are positioned opposed to each other.

Figure 3A:
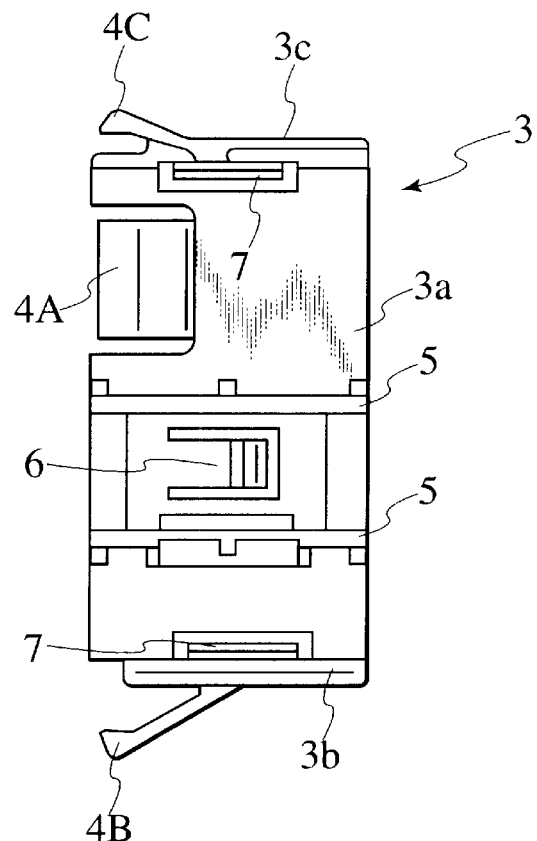
FIG. 3A is a front view of one of the frame bodies showing an embodiment of the fixing structure of the storage device of the invention.
Figure 3B:
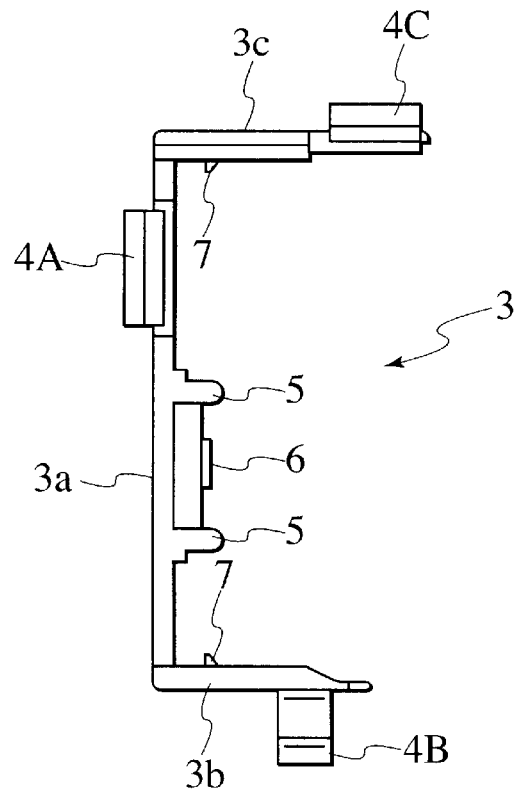
FIG. 3B is a side view of one of the frame bodies showing an embodiment of the fixing structure of the storage device of the invention.

The frame members 3 have symmetrical U-shaped cross sections. Each of the frame members 3 are integrally formed of polyacetal which is resin material having greater toughness than that of the housing 1. As shown in FIG. 3A and FIG. 3B more concretely, a front surface wall 3a is notched to form the wide resilient leg piece 4A which projects outward. A pair of rails 5 for guiding two projections 2a formed on a side surface of the storage member 2 are formed inside the front surface wall 3a. A resilient pawl 6 across which the projection 2b of the storage member 2 rides in a ratchet manner is formed between the rails 5. On the other hand, a narrow resilient leg piece 4B which largely projects outward is projected from one side wall 3b. A lock pawl 7 which is retained to a recess 9 formed in an angle portion of the housing 1 is formed in the vicinity of the resilient leg piece 4B. The other side wall 3c is formed with a wide resilient leg piece 4C which is similar to that on the side of the front surface wall 3a by notching. A lock pawl 7 which is retained in a recess 9 formed in the angle portion of the housing 1 is formed in the vicinity of the resilient leg piece 4C. Here, polyacetal is employed as the resin material having excellent toughness in this embodiment, the present invention can of course be constituted even if engineering plastic such as polycarbonate, denatured polyphenylene oxide and polyamide is used.

As shown in FIG. 2, free ends of the one side wall 3b and the other side wall 3c of each of the frame members 3 are provided with bent pieces 11 swelling outward. When each of the frame members 3 are mounted to the outer periphery of the housing 1, the bent piece 11 is brought into abutment against a rib wall 1a of the housing 1 and is bent. With this, wobbling of the frame member 3 is prevented.

The housing 1 is formed with notch windows 8 toward which the pair of rails 5 on the opposite sides face. The housing 1 is also formed with supporting pieces 10 which sandwich the side edges of the frame members 3 on the opposite sides of the recess 9. The rib wall 1a is provided in parallel to the supporting piece 10 at a deeper side of the rib wall 1a.

Figure 4:
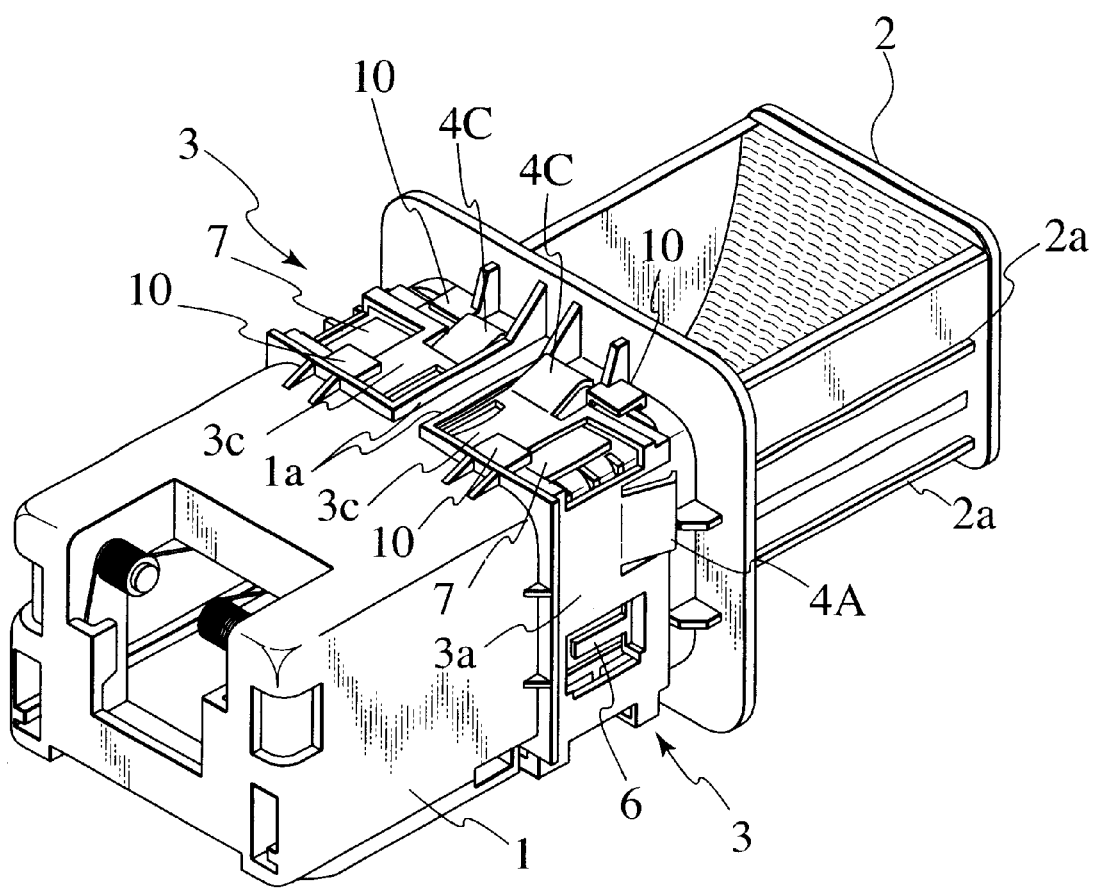
FIG. 4 is a perspective view showing a state in which a pair of frame bodies are mounted to a housing of an embodiment of the fixing structure of the storage device of the invention.

When the coin case is fixed in a mounting hole H formed in the instrument panel P under the fixing structure of the above structure, a state in which the storage member 2 is supported in the housing 1 is obtained first. Then, the pair of frame members 3 are brought into abutment against the opposite sides of the housing 1 and in this state, the frame members 3 are strongly pushed against the opposite sides. Then, the lock pawls 7 are retained to the corresponding recesses 9 of the housing 1 and the side edges of the frame members 3 are sandwiched between the inside of the supporting pieces 10 at the same time. With this, as shown in FIG. 4, the pair of frame members 3 can reliably be mounted to the outer periphery of the housing 1.

Figure 5:
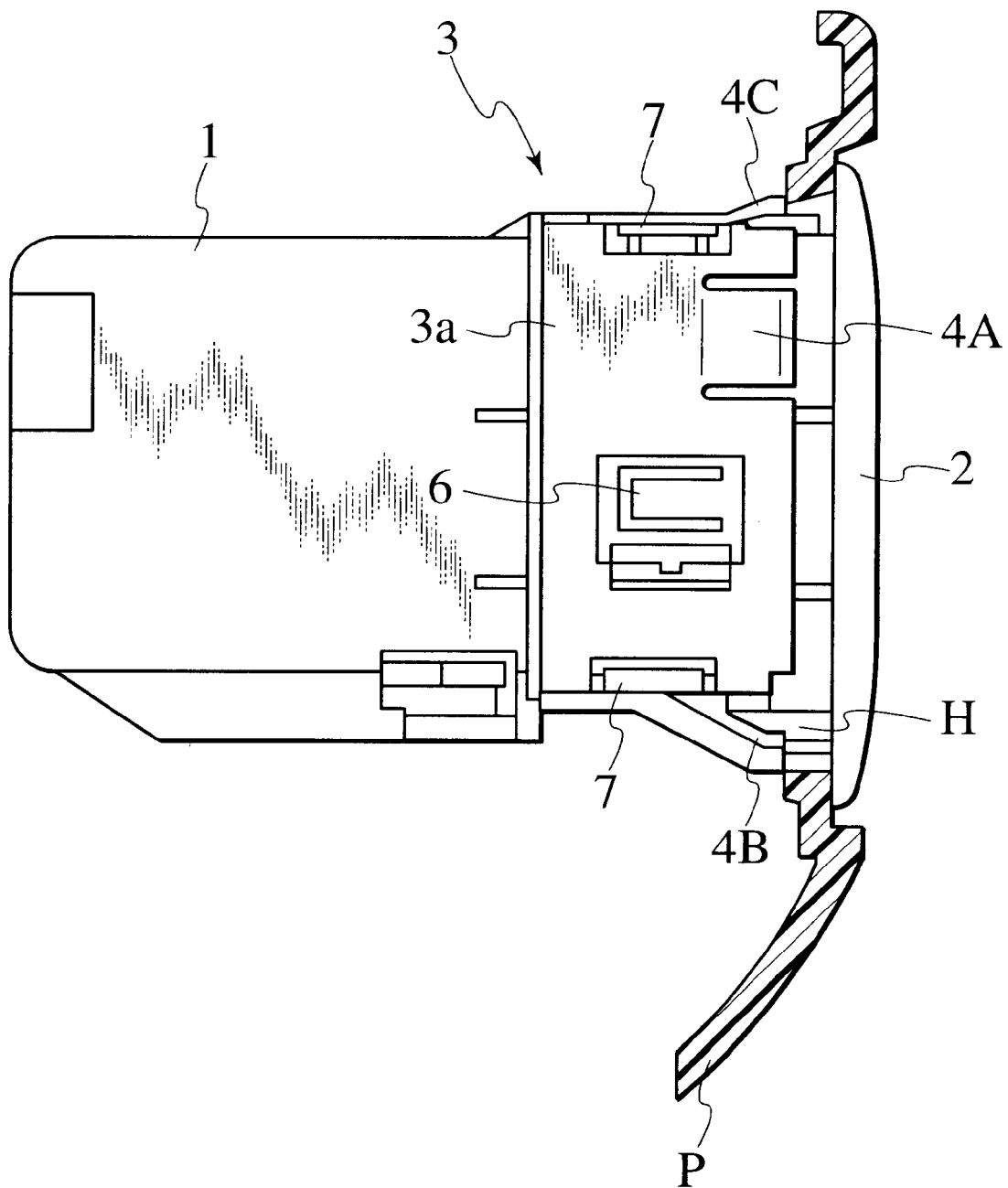
FIG. 5 is a sectional view showing a state in which a housing is fixed to a mounting hole of an instrument panel of an embodiment of the fixing structure of the storage device of the invention.

After this state was obtained, the housing 1 is pushed into the mounting hole H of the instrument panel P from a rear end of the housing 1. The resilient leg pieces 4A, 4B and 4C are bent inward by the hole edges of the mounting hole H and pass through the mounting hole H. After the resilient leg pieces have passed through, the end tips of the resilient leg pieces are retained in the hole edges of the mounting hole H. With this, the coin case is mounted to the instrument panel P as shown in FIG. 5. The resilient leg pieces 4A, 4B and 4C are integrally formed on the frame members 3 and made of a resin having a greater toughness than that of the housing 1. Therefore, the resilient leg piece is sufficiently bent inside and outside by its resiliency and resiliently retained in the hole edge of the mounting hole H and thus, both the mounting condition and mounting state are excellent.

Any of the pair of frame members 3 includes the front surface wall 3a and both the side walls 3b and 3c defining the U-shape, and each of the front surface wall 3a and both the side walls 3b and 3c includes the resilient leg pieces 4A, 4B and 4C. Therefore, each of the four surfaces of the housing 1 has one or two resilient leg pieces 4A, 4B and 4C. Thus, the fixing state of the housing 1 is extremely stable.

When the storage member 2 is opened or closed, the two projections 2a formed on the side surface of the storage member 2 are guided by the pair of rails 5 and moved. The pair of rails 5 are integrally formed on the frame member 3 which is made of polyacetal which is resin material having greater abrasion resistance than that of the housing 1. Therefore, the storage member 2 can be moved extremely smoothly.

The entire content of a Japanese Patent Application No. P2001-196686 with a filing date of Jun. 28, 2001 is incorporated herein by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. The fixing structure for a storage device, comprising:
   a mounting hole;
   a housing fixed to the mounting hole;
   a storage member supported in the housing so that the storage member can be opened and closed;
   a frame member mounted to an outer periphery of the housing; and
   a resilient leg piece integrally provided on the frame member and retained to a hole edge of the mounting hole,
   wherein the frame member is made of resin material having greater toughness than that of the housing.

2. The fixing structure for a storage device according to claim 1,
   wherein the frame member has a U-shaped cross section, and each of three surfaces of the frame member are provided with the resilient leg piece.

3. The fixing structure for a storage device according to claim 1, further comprising:
   a projection provided in the storage member; and
   a rail provided in the frame member,
   wherein when the storage member is opened and closed in the housing, the projection is guided by the rail and moved, and
   wherein the frame member is made of the resin material having greater abrasion resistance than that of the housing.

4. The fixing structure for a storage device according to claim 3,
   wherein a notch window is formed on the housing toward which the rail face, and
   the resin material having greater toughness and abrasion resistance is engineering plastic.

* * * * *